(12) United States Patent
Barber et al.

(10) Patent No.: US 10,042,873 B2
(45) Date of Patent: Aug. 7, 2018

(54) DATA ENCODING AND PROCESSING COLUMNAR DATA

(71) Applicant: International Business Machines Corporation, Armonk, NY (US)

(72) Inventors: Ronald J. Barber, San Jose, CA (US); Sam S. Lightstone, Ontario (CA); Guy M. Lohman, San Jose, CA (US); Lin Qiao, San Jose, CA (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/945,502

(22) Filed: Nov. 19, 2015

(65) Prior Publication Data

US 2016/0070730 A1     Mar. 10, 2016

Related U.S. Application Data (63) Continuation of application No. 13/918,832, filed on Jun. 14, 2013, now Pat. No. 9,244,935.

(51) Int. Cl.
    *G06F 17/30*   (2006.01)
(52) U.S. Cl.
    CPC .. *G06F 17/30315* (2013.01); *G06F 17/30153* (2013.01); *G06F 17/30324* (2013.01); *G06F 17/30457* (2013.01)
(58) Field of Classification Search
    None
    See application file for complete search history.

(56) References Cited

U.S. PATENT DOCUMENTS

| | | | | |
|---|---|---|---|---|
| 5,548,664 | A | * | 8/1996 | Knowlton ........... G06F 3/04817 358/464 |
| 7,024,414 | B2 | * | 4/2006 | Sah ................... G06F 17/30595 |
| 7,868,789 | B1 | | 1/2011 | Binnig et al. |
| 7,966,343 | B2 | | 6/2011 | Yang et al. |
| 8,239,421 | B1 | | 8/2012 | Marwah et al. |
| 8,356,060 | B2 | | 1/2013 | Marwah et al. |

(Continued)

FOREIGN PATENT DOCUMENTS

| | | |
|---|---|---|
| CN | 102112986 | 6/2011 |
| CN | 102171695 | 8/2011 |
| CN | 103026631 | 4/2013 |

OTHER PUBLICATIONS

Klose, Sebastian, "A Cost Model for Compression Techniques in Hybrid Main Memory Database Systems", Master's Thesis, May 13, 2011, pp. 1-87, Hasso Plattner Institute for IT Systems Engineering, Potsdam-Babelsberg Germany.

*Primary Examiner* — Belix M Ortiz Ditren
(74) *Attorney, Agent, or Firm* — Lieberman & Brandsdorfer, LLC (57) ABSTRACT

The embodiments described herein relate to accessing a plurality of data elements. A page of column data is compressed and stored in a format that includes a collection of data elements. A tuple map is stored, and the collection of data elements is indexed via the tuple map. A query is processed based on the compressed page by identifying a set of tuple identifiers mapping to stored data in support of the query. Each tuple identifier corresponds to a location of a respective tuple of the compressed page.

17 Claims, 6 Drawing Sheets

(56) References Cited

U.S. PATENT DOCUMENTS

| | | | |
|---|---|---|---|
| 8,838,890 B2 * | 9/2014 | Gupta | G06F 3/0689 |
| | | | 711/114 |
| 2011/0029569 A1 | 2/2011 | Ganesh et al. | |
| 2012/0054225 A1 | 3/2012 | Marwah et al. | |
| 2012/0319876 A1 | 12/2012 | Froemmgen | |
| 2013/0024433 A1 | 1/2013 | Amit et al. | |
| 2014/0207744 A1 * | 7/2014 | Carney | H03M 7/30 |
| | | | 707/693 |

* cited by examiner

DATA ENCODING AND PROCESSING COLUMNAR DATA

CROSS REFERENCE TO RELATED APPLICATION(S)

This application is a continuation patent application claiming the benefit of the filing date of U.S. patent application Ser. No. 13/918,832 filed on Jun. 14, 2013 and titled "Data Encoding and Processing Columnar Data" now pending, which is hereby incorporated by reference.

BACKGROUND

The embodiments described herein relate to compressing and storing a plurality of data elements in a page format. More specifically, the embodiments described herein relate to the manner in which the page format is organized, including indexing of the data elements, so that the stored data elements can be accessed.

Data compression is the process of transforming information from a first representation to a second representation, with the second representation being smaller than the first representation (also known as the original representation). Compressed data may be decompressed from which the original, or a close approximation to it, can be recovered. Compression and decompression processes are often referred to as encoding and decoding. Data compression has important applications in the areas of data storage and data transmission. Besides space savings, other parameters of concern include encoding and decoding speeds and workspace requirements, the ability to access and decode partial files, and error generation and propagation.

BRIEF SUMMARY

A method, computer program product, and system are provided for processing a query based on a compressed page of column data.

According to one aspect, a method is provided for processing a query based on a compressed page of column data. A page of column data is compressed and stored in a format that includes a collection of data elements. A tuple map is stored, and the collection of data elements is indexed via the tuple map. A query is processed based on the compressed page by identifying a set of tuple identifiers mapping to stored data in support of the query. Each tuple identifier corresponds to a location of a respective tuple of the compressed page.

According to another aspect, a computer program product is provided to process a query based on a compressed page of column data. The computer program product includes a computer readable storage device having computer readable program code embodied therewith. The program code is executable by a processor to compress and store a page of column data in a format that includes a collection of data elements. A tuple map is stored, and the collection of data elements is indexed via the tuple map. A query is processed based on the compressed page by identifying a set of tuple identifiers mapping to stored data in support of the query. Each tuple identifier corresponds to a location of a respective tuple of the compressed page.

According to yet another aspect, a system is provided to support query processing based on a compressed page of column data. The system includes a processing unit in communication with memory, and a functional unit in communication with the processing unit. The functional unit compresses a page of column data in a format that includes a collection of data elements, and stores the compressed page in the memory. A tuple map is stored in the memory, and the collection of data elements is indexed via the tuple map. A query is processed based on the compressed page by identifying a set of tuple identifiers mapping to stored data in support of the query. Each tuple identifier corresponds to a location of a respective tuple of the compressed page.

Other features and advantages of the embodiments described herein will become apparent from the following detailed description, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components, as generally described and illustrated in the Figures herein, may be arranged and designed in a wide variety of different configurations. Thus, the following detailed description of the embodiments of the apparatus, system, and method, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment described herein. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the claims herein.

Order preserving frequency-based dictionary compression is exploited to perform SQL operations on compressed values. In one embodiment, the compressed values are packed in a dense bit-aligned manner so that multiple values fit in a register and can be processed simultaneously via single-instruction multiple-data (SIMD).

Columns of a database table are partitioned into column groups. In one embodiment, each column belongs to exactly one column group. In a select embodiment, commonly referred to as a column store, each column group contains a single column. Column group data are stored in pages which may be of a fixed or variable. A projection of a row/tuple onto a column group is referred to as a tuple. Tuples are stored in the same order across all column groups; tuples are identified by a virtual identifier referred to herein as a tuple sequence number (TSN), an integer that may be used to locate a given tuple. In one embodiment, a page contains a single range of TSNs.

Figure 1:
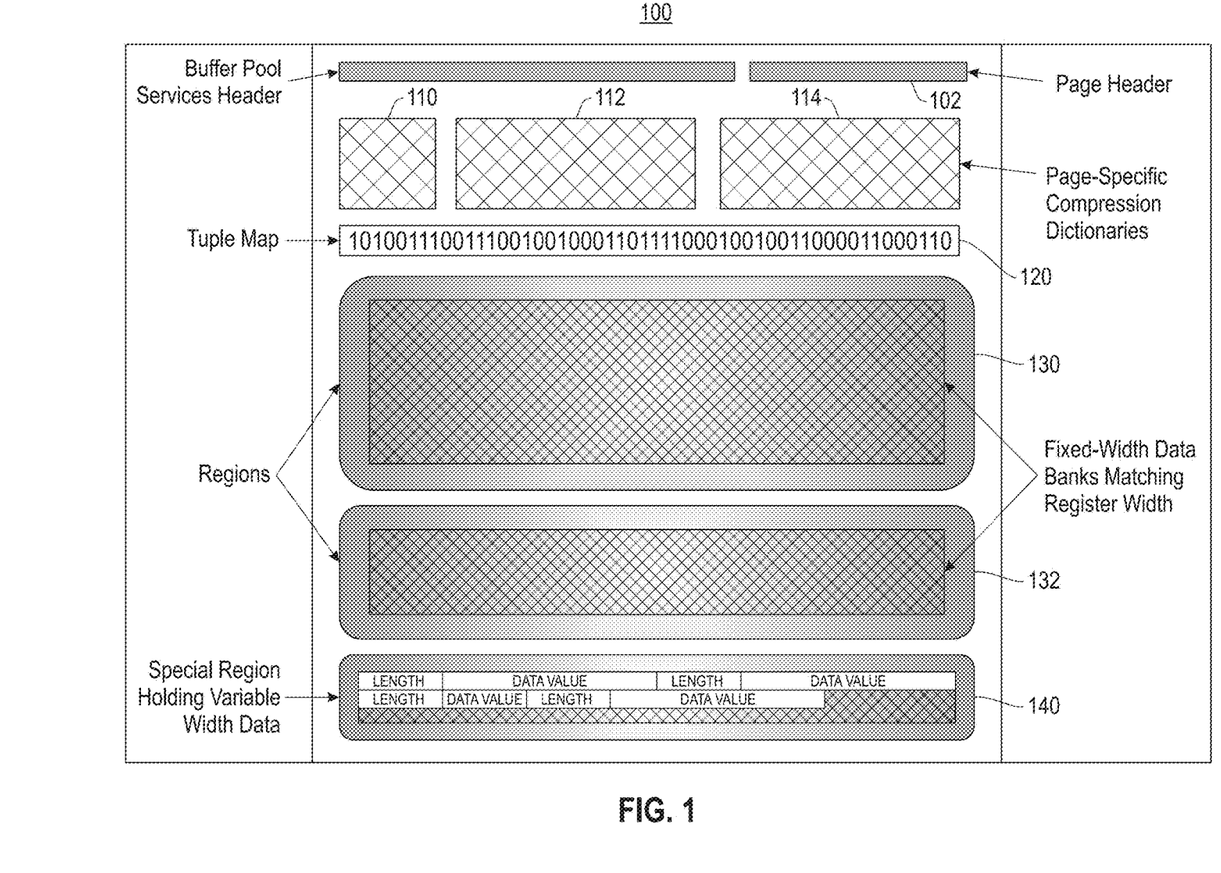
FIG. 1 depicts a page format for data encoding with composite processing benefits.

FIG. 1 is a block diagram (100) of a page format for data encoding with composite processing benefits. The page includes a page header (102), page specific compression dictionaries (110), (112), and (114), a tuple map (120), arrays (130) and (132), and a special region for holding variable width data (140). The regions (130) and (132) may contain coded values, i.e. compressed values, or un-encoded values, i.e. raw values. In one embodiment, regions (130) and (132) are made up of fixed width data banks matching register width for storage of compressed values. The location and size of each of the page items can be stored or inferred from meta-data stored in the page header (102). In one embodiment, each page stores data for one column group, but a single column of data is typical. Similarly, in order to enable vector processing with SIMD acceleration, the data is stored in a format that packs data values while compressed into a bit structure that matches or nearly matches the register width of the processing unit. More specifically, unused bits of a length of compressed data elements in one of the arrays (130) and (132) are aligned to a boundary, with the boundary being a multiple of a machine word size. Thisalignment mitigates bit shifting that is associated with access of any one of the stored data elements. In one embodiment, access includes loading one or more of the stored elements into a register. The collection of values stored in the bit structure where elements are aligned to a boundary is referred to herein as an array. The section of the page holding these arrays is called a region, referred to here as (130) and (132). In one embodiment, the arrays stored within the region are called a data bank, or a bank.

In order to leverage the benefits of compression without the overhead of decompression, the data in each array (130) and (132) is binary-wise comparable for testing equality and range predicates. Each array holds data that is compressed with common characteristics, with the different arrays holding data with different characteristics. More specifically, the data in array (130) possesses a first characteristic and the data in the array (132) possesses a second characteristic, with the first and second characteristic being different. For example, data in the array (130) may represent all data for the page that is encoded with 2 bits per value, while data in the array (132) may represent all data encoded with 7 bits. Each array holds the maximum number of values that can fit in a processing unit register for that server. In one embodiment, encoded sizes that are not a power of two indicates that some number of bits in each array may be padded to fit the register's length. The special region (140) is a region employed to hold data that is variable length. The data in the special region (140), also referred to herein as a third array, is indexed via the tuple map (120). Each entry in the tuple map (120) is an index indicating in which array that TSN is located. Since the data in this region is not encoded to a fixed-length value, the data is not processed as fixed length arrays.

As values are placed on the page based on the encoded width, it is unlikely that they will appear on the page in the order of their arrival. In order to reconstruct the original sequence of the values, i.e. in order to find the $N^{th}$ value on the page, a bit map is stored which indicates the identifier of the region in which the $N^{th}$ value is located. For example, for a page containing three regions, two bits are required to indicate whether a value is located in the first, second, or third region of the page. The bit map is called the tuple map (120), also referred to herein as a vector, and is stored directly as a bit map or as a separate data bank packed to match the register width of the processing unit registers. More specifically, the tuple map (120) records to which region each tuple was assigned by the encoding. An index of the tuple map (120) is a page-relative TSN and each entry is the index of the region to which the TSN belongs. Data elements stored in the arrays (130) and (132) are indexed via the vector (120), which includes a mapping of the data elements stored in the arrays (130) and (132). For example, in an embodiment with a two region page, the tuple map entries are one bit each. Accordingly, by grouping like formatted tuples together into arrays, long runs of tuples that have the same format are formed. In one embodiment, the tuple map can be stored in bit-major order. For example, in a tuple map where entries are two bits each, the first bit of each entry can be stored as one bitmap, followed by a second bitmap holding the second bit of each entry.

Figure 2:
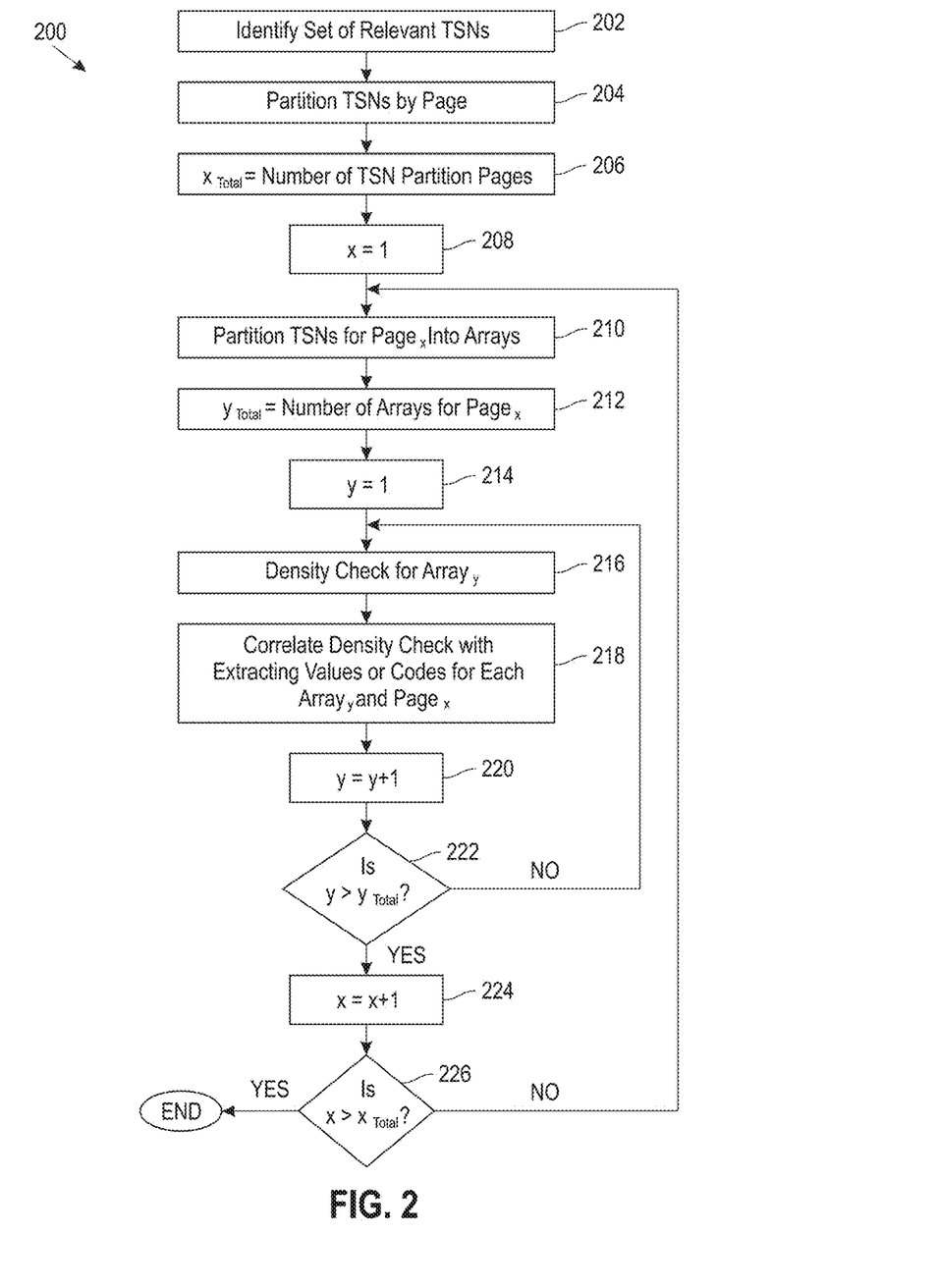
FIG. 2 depicts a flow chart illustrating a process for loading column data.

The compressed pages are utilized for query processing, which includes accessing values of code from one or more banks of the region. FIG. 2 is a flow chart (200) illustrating a process for loading column data. Based on a query filter, a set of relevant TSNs are identified (202). In one embodiment, the identified TSNs are uploaded in batches for processing per available processor cache. The identified, and uploaded, TSNs are partitioned by page (204). In one embodiment, the total number of pages to which the TSNs are partitioned is identified and assigned to a variable $X_{Total}$ (206). An associated counting variable X is initialized (208). For each page$_X$, the TSNs for that specific page are further partitioned into arrays (210). In one embodiment, the total number of arrays for page$_X$ is identified and assigned to a variable $Y_{Total}$ (212). An associated counting variable Y is initialized (214). Following step (214), a density check for each array Y is conducted (216). A density check looks at occupancy in an array, and specifically how many values are of interest to the TSN list.

The density check is shown herein following the array identification. However, the density check may occur at a different step in the value and code access. For example, the density check may occur following the identification of relevant TSNs at step (202), or optionally following the partitioning of TSNs after page (204). In one embodiment, the density check is an approximation based on an estimation sample of a population of data. Similarly, in one embodiment, occupancy of less than 25% is considered sparse, although this value is not limiting. Accordingly, values and codes are accessed for each region, with an access technique selected based on the density check.

The results of the density check directly correlate with the process of accessing values or codes for each array Y and each page X (218). In a sparsely populated region, for each input TSN the array offset is identified and the value or code is accessed. In a densely populated region, the entire region is loaded and filtered. Regardless of the technique employs, a data element and position of the data element in one of the arrays is determined. In one embodiment, the machine word multiple at which the data element is stored within one of the arrays is computed, and a bit offset of the data element is calculated at the computed machine word multiple. Similarly, in one embodiment, the calculation of the machine word multiple includes multiplying a position of the data element by a pre-computed integer modular inverse of a quantity of data elements that fit within each machine word multiple, e.g. indicates the location of which machine word the code is located. The code access at step (218) includes accessing at least one data element at a specific position from one of the arrays. This includes identifying the array, accessing the data elements in the identified array, and placing the accessed data elements into a new array. In one embodiment, an arrangement of the placed data elements is word-aligned.

Following the access with the associated technique, the counting variable for the page arrays, Y, is incremented (220). It is then determined if all of the page arrays have been processed (222). A negative response to the determination at step (222) is followed by a return to step (216), and a positive response to the determination at step (222) is followed by an increment of the page counting variable, X, (224). It is then determined if all of the identified pages have been processed (226). A negative response to the determination at step (226) is followed by a return to step (210), and a positive response to the determination at step (226) concludes the value access and placement process from the compressed pages of data.

Figure 3:
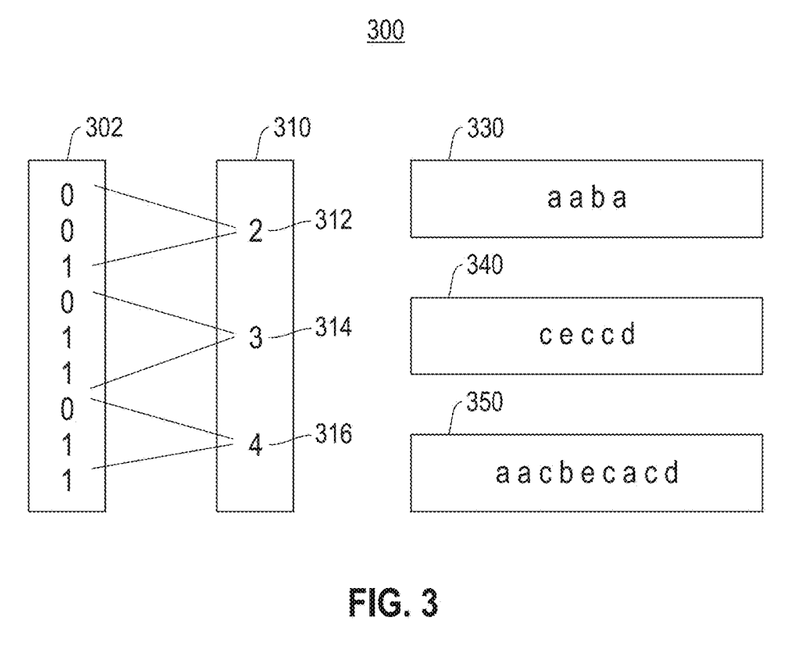
FIG. 3 depicts a block diagram depicting a cumulative histogram within the page format.

As demonstrated in FIG. 2, the tuple map is employed to access compressed data from one or more pages. Furthermore, as demonstrated in FIG. 1, each page representing compressed data includes two or more arrays, with each of the arrays storing different data based upon data characteristics. The tuple map is employed to identify the array in the page. In one embodiment, a cumulative histogram is employed to determine the offset within an identified array for specific data. FIG. 3 is a block diagram (300) depicting the cumulative histogram within the page format. In the example herein, a column of values (350) is shown where the values for "a" and "b" have a different length of encoding than those for "c", "d", and "e". A tuple map (302) is depicted with a bitmap representation, i.e. all entries are represented in bits of 0 and 1. The tuple map (302) is in communication with a cumulative histogram (310), and two arrays (330) and (340). Each bit having one value represents data having a first characteristic stored in a first array (330), and each bit having a second value represents data having a second characteristic stored in a second array (340). In this example, the cumulative histogram (310) has a numerical value (312), (314), and (316), each value representing inclusively how many bits of a specified value are present in 3-bit increments. In one embodiment, the parameters of the example shown herein may vary, including but not limited to, the bit representation and the increment. The numerical values (312), (314), and (316) maintain a count for the arrays (330) and (340) of prior references in the tuple map to that array, thereby enabling prior entries in the tuple map to be skipped when locating data in one of the identified arrays. Accordingly, the cumulative histogram functions as a metastructure on top of the tuple map to bring efficiency into accessing the tuple map.

Figure 4:
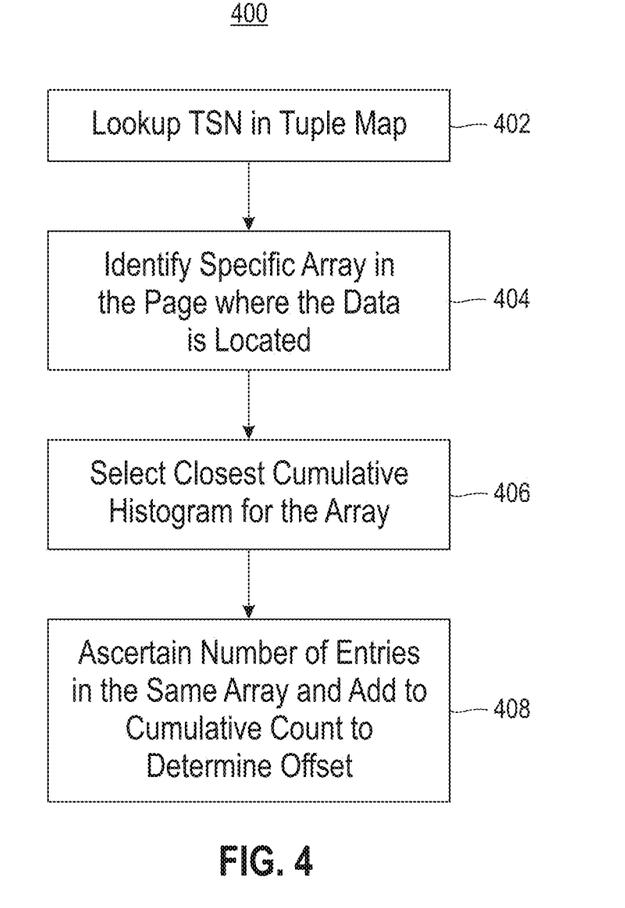
FIG. 4 depicts a flow chart illustrating a process for leveraging the cumulative histogram together with the tuple map for data access.

FIG. 4 is a flow chart (400) illustrating a process for leveraging the cumulative histogram together with the tuple map for data access. The first step is to look up the TSN in the tuple map (402), which will identify a specific array in the page where the data is located (404). Once the array is identified, the closest cumulative histogram for the array of interest is selected (406). This histogram is leveraged to ascertain the offset within the array for the data. More specifically, the number of entries in the same array are ascertained and added to the cumulative count to determine the offset within the array for the data value or code (408). Accordingly, the cumulative histogram functions in conjunction with the tuple map to identify an offset for the data.

Figure 5:
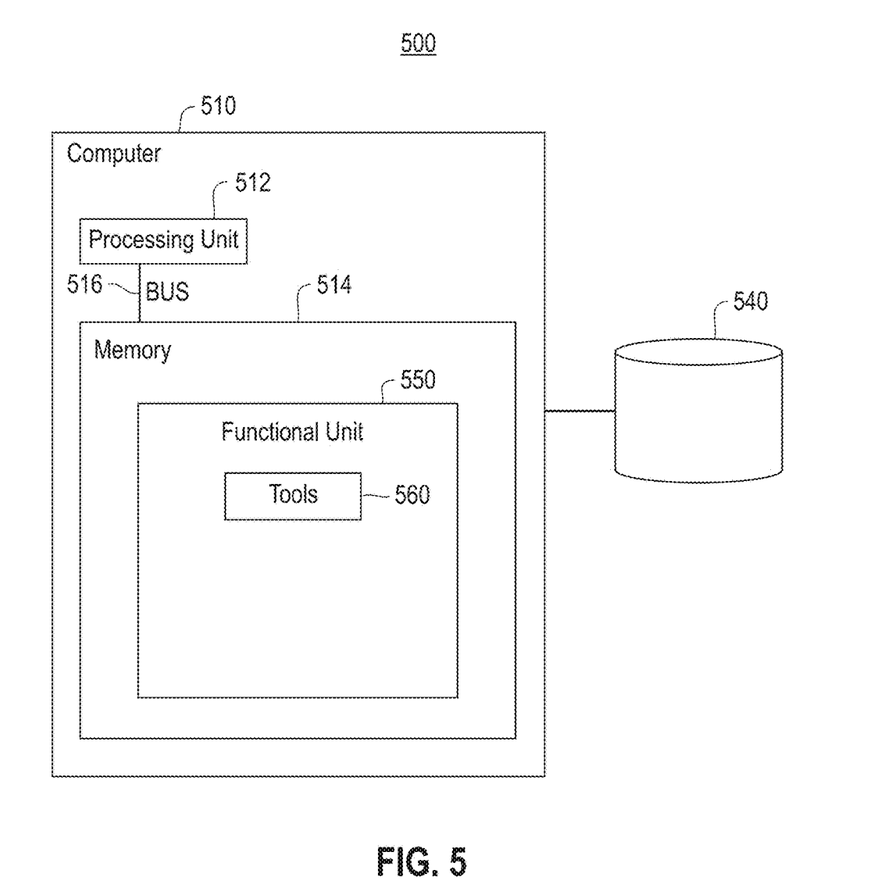
FIG. 5 depicts a block diagram illustrating exemplary tools embedded in a computer system to support data encoding and processing.

The processes shown in FIGS. 1-4 may be embodied as hardware components. FIG. 5 is a block diagram (500) illustrating tools embedded in a computer system to support data encoding and processing. As shown, the system includes a computer (510) to store pages of compressed data in the format described in FIG. 1 and tools to support access and placement of the compressed data. The computer (510) is provided with a processing unit (512) in communication with memory (514) across a bus (516). Data storage (540) is provided in local communication with the computer (510) to store received or generated data. In one embodiment the data storage may be remote with access to the storage provided through network communication.

The computer (510) includes a functional unit (550) having one or more tools (560) to support data encoding and access thereto. The tools (560) embedded in the functional unit (550) support the functionality of compression and storage of a page of column data as described in detail in FIGS. 1-4, including indexing the data elements, and access to the stored data elements. The compression includes a format for the data that includes multiple arrays, with different arrays storing compressed data within different sets of common characteristics.

As identified above, the tools (560) are shown residing in the functional unit (550) of the computer (510). Although in one embodiment, the functional unit (550) and tools (560), respectively, may reside as hardware tools external to the memory (514). In another embodiment, the tools (560) may be implemented as a combination of hardware and software in the shared pool of resources. Similarly, in one embodiment, the tools (560) may be combined into a single functional item that incorporates the functionality of separate items. As shown herein, the tools (560) are shown local to one computer system (510). However, in one embodiment they may be collectively or individually distributed across a shared pool of configurable computer resources and function as a unit. Accordingly, the tools may be implemented as software tools, hardware tools, or a combination of software and hardware tools.

Furthermore, the described features, structures, or characteristics may be combined in any suitable manner in one or more embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring various aspects.

The tools (560) may be implemented in programmable hardware devices such as field programmable gate arrays, programmable array logic, programmable logic devices, or the like. The tools (560) may also be implemented in software for processing by various types of processors. An identified director or manager of executable code may, for instance, comprise one or more physical or logical blocks of computer instructions which may, for instance, be organized as an object, procedure, function, or other construct. Nevertheless, the executable of an identified director or manager need not be physically located together, but may comprise disparate instructions stored in different locations which, when joined logically together, comprise the managers and achieve the stated purpose of the director and managers.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Figure 6:
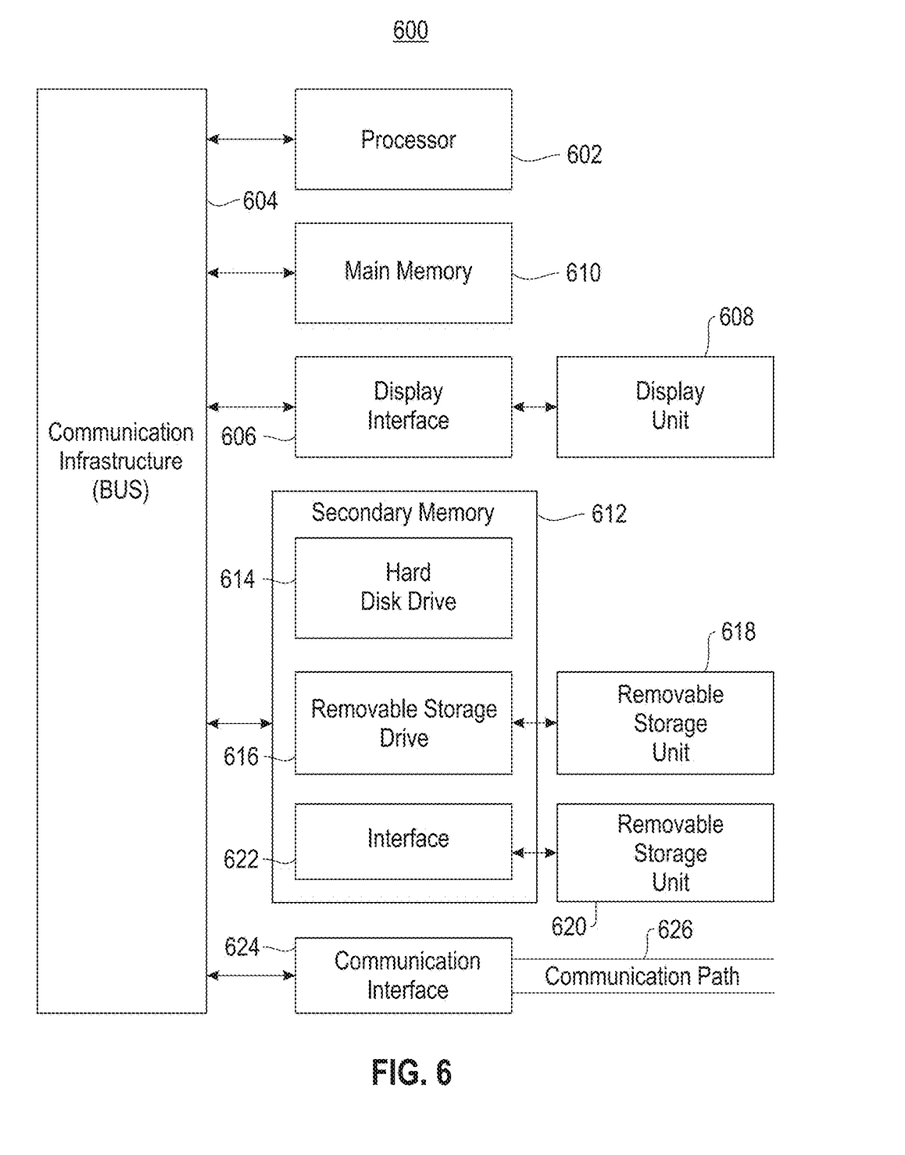
FIG. 6 depicts a block diagram of an exemplary computing environment.

Referring now to the block diagram (600) of FIG. 6, additional details are now described with respect to implementing an exemplary computer system. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614), a solid state drive, and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) is in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the embodiments as discussed herein. In particular, the computer programs, when run, enable the processor (602) to perform the features of the computer system. Accordingly, such computer programs represent controllers of the computer system.

As will be appreciated by one skilled in the art, the aspects described herein may be embodied as a system, method or computer program product. Accordingly, the aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects are described above with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited in the form disclosed. Many modifications and variations will be apparent to those of ordinary skill in the art without departing from the scope and spirit of the claims. The embodiments were chosen and described in order to best explain the principles and the practical application, and to enable others of ordinary skill in the art to understand the claims, with various embodiments and modifications as are suited to the particular use contemplated.

It will be appreciated that, although specific embodiments have been described herein for purposes of illustration, various modifications may be made without departing from the spirit and scope of the claims. Accordingly, the scope of protection is limited only by the following claims and their equivalents.

We claim:

1. A method comprising:
compressing and storing column data in a page format, each page comprising a collection of data elements, including: a first data array and a second data array, and a tuple map, wherein the tuple map is a data bank having a width matching a register width of a processing unit register;
indexing the first and second data arrays via the tuple map; and
processing a query based on the compressed page, including identifying a set of tuple identifiers mapping to stored data in support of the query, wherein each tuple identifier corresponds to a location of a respective tuple of the compressed page.

2. The method of claim 1, wherein the collection of data elements comprises a first set of data elements having a first common characteristic stored in the first data array and a second set of data elements having a second common characteristic stored in the second data array, and wherein the first and second characteristics are different.

3. The method of claim 2, further comprising:
uploading the identified set of tuple identifiers in batches for processing per available processor cache;
partitioning the uploaded set of tuple identifiers; and
identifying a quantity of relevant values of the array based on the uploaded set of tuple identifiers.

4. The method of claim 2, further comprising constructing a cumulative histogram comprising one or more numerical values, wherein each numerical value is associated with a cumulative count of prior references in the map to an array.

5. The method of claim 4, further comprising identifying an offset within the array in support of the query based on the histogram, including identifying an array in the page where the data is located, ascertaining a quantity of entries in the array, and adding the quantity of entries to a cumulative count to determine the offset.

6. A computer program product comprising a computer readable program storage device having program code embodied therewith, the program code executable by a processor to:
  compress and store column data in a page format, each page comprising a collection of data elements, including a first data array and a second data array, and a tuple map, wherein the tuple map is a data bank having a width matching a register width of a processing unit register;
  index the first and second data arrays via the tuple map; and
  process a query based on the compressed page, including program code to identify a set of tuple identifiers mapping to stored data in support of the query, wherein each tuple identifier corresponds to a location of a respective tuple of the compressed page.

7. The computer program product of claim 6, wherein the collection of data elements comprises data elements having a first common characteristic stored in the first data array and data elements having a second common characteristic stored in the second data array, and wherein the first and second characteristics are different.

8. The computer program product of claim 7, further comprising program code to:
  upload the identified set of tuple identifiers in batches for processing per available processor cache;
  partition the uploaded set of tuple identifiers; and
  identify a quantity of relevant values of the array based on the uploaded set of tuple identifiers.

9. The computer program product of claim 7, further comprising program code to construct a cumulative histogram comprising one or more numerical values, wherein each numerical value is associated with a cumulative count of prior references in the map to an array.

10. The computer program product of claim 9, further comprising program code to identify an offset within the array in support of the query based on the histogram, including program code to identify a location in the page where the data is located, ascertain a quantity of entries in the array, and add the quantity of entries to a cumulative count to determine the offset.

11. A system comprising:
  a processor in communication with memory; and
  a programmable hardware device in communication with the processor, the programmable hardware device to:
    compress a page of column data, and store the compressed page in the memory, wherein the page is compressed and stored in a format comprising a collection of data elements, including a first data array, a second data array, and a tuple map, wherein the tuple map is a data bank having a width matching a register with of a processor register;
    index the first and second data arrays via the tuple map; and
    process a query based on the compressed page, including the functional unit to identify a set of tuple identifiers mapping to stored data in support of the query, wherein each tuple identifier corresponds to a location of a respective tuple of the compressed page.

12. The system of claim 11, wherein the collection of data elements comprises data elements having a first common characteristic stored in the first data array and data elements having a second common characteristic stored in the second data array, and wherein the first and second characteristics are different.

13. The system of claim 12, further comprising the programmable hardware device to:
  upload the identified set of tuple identifiers in batches for processing per available processor cache;
  partition the uploaded set of tuple identifiers; and
  identify a quantity of relevant values of the array based on the uploaded set of tuple identifiers.

14. The computer program product of claim 12, further comprising the programmable hardware device to construct a cumulative histogram comprising one or more numerical values, wherein each numerical value is associated with a cumulative count of prior references in the map to an array.

15. The computer program product of claim 14, further comprising the programmable hardware device to identify an offset within the array in support of the query based on the histogram, including the programmable hardware device to identify a location in the page where the data is located, ascertain a quantity of entries in the array, and add the quantity of entries to a cumulative count to determine the offset.

16. The method of claim 1, wherein the first and second data arrays are fixed width data banks matching the register width of the processing unit register.

17. The method of claim 1, further comprising employing the tuple identifier in the tuple map to identify a specific array and page for locating data.

* * * * *